D. MATTHEW.
INSTRUMENT FOR PREVENTING INCRUSTATION OF STEAM BOILERS.

No. 64,992. Patented May 21, 1867.

Witnesses:
Charles Speer,
Frank H. Bishop.

Inventor:
David Mathew
By his Attorney
J. N. McIntire

United States Patent Office.

DAVID MATTHEW, OF PRAIRIE DU CHIEN, WISCONSIN

Letters Patent No. 64,992, dated May 21, 1867.

IMPROVEMENT IN INSTRUMENTS FOR PREVENTING INCRUSTATION OF STEAM BOILERS.

The Schedule referred to in these Letters Patent and making part of the same

TO ALL WHOM IT MAY CONCERN:

Be it known that I, DAVID MATTHEW, of Prairie Du Chien, in the county of Crawford, in the State of Wisconsin, have invented a new Method or Means of Cleaning Steam Boilers; and I do hereby declare that the following is a full and exact description thereof, reference being had to the accompanying drawings, making part of this application.

My invention relates to a method or means of cleaning, that is, removing the scale from steam boilers. I have discovered that if a mass of metallic pieces, copper and zinc, (or zinc only, if the boiler tubes be of copper) be placed together in the water of a steam boiler and the water heated to make steam, an action will take place by which all scale will be effectually removed from the surfaces of the interior of the boiler; and to enable those skilled to understand and work my invention, I will describe more fully, referring by letters to the accompanying drawings, the mode of carrying it out which I have successfully practised.

Figure 1:
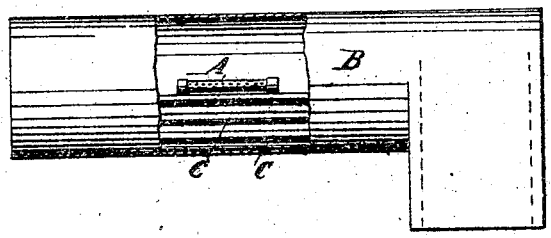
Figure 2:
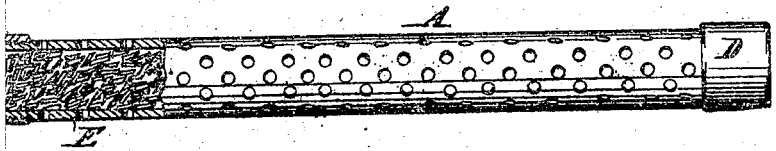

In the drawings, Figure 1 is an illustration in elevation of an ordinary tubular boiler, B, showing a portion broken away. At A is shown the cage containing the metallic scraps, which is more clearly shown on an enlarged scale at Figure 2. This cage, as shown at fig. 2, I have made of a piece of iron tubing, A, perforated with many holes, and provided at each end with a screw-cap, D, also perforated, and filled with small pieces or scraps of copper and zinc, as clearly seen at E, where the tube is shown broken away to display the filling, and where the pieces tinted in red represent the copper scrap, and those tinted in blue the zinc scrap.

I have shown and described the simple and effective form or construction of apparatus which I have made and used with much success, but of course the mode of construction may be varied from that shown without departing from my invention, it only being essential to the latter that there be some sort of cage or case to contain the scrap or pieces of suitable metal, which, when placed in the boiler, as shown and described, induce to the desired effect, viz, the complete and rapid removal of all scale from the boiler surface. I have found by experience that where the tubes of the boiler are made of copper, the copper scrap may be omitted from the cage A, and only pieces of zinc used therein.

I am aware that potash, scaling powders, and other substances, have been used to remove scale from steam boilers. I am also aware that the scale has been removed by the employment of an elastic wire, but I do not desire to have my invention or discovery confounded with any such means of cleansing boilers. As I have explained, my invention consists in the arrangement of a quantity or mass of pieces of metal suitably confined or held, so that when submerged an action arises effecting the removal of the scale from the boiler, as I have stated.

I need not allude particularly to the advantages of my invention for a ready and rapid means of economically removing the scale from steam boilers, as it is universally acknowledged to be a great desideratum.

I have thoroughly tested the efficiency of my new means of cleaning steam boilers, and find it to surpass all known methods.

I do not wish to be understood as limiting my invention to the precise ingredients (materials) mentioned, if there are others possessing the same chemical properties; but what I claim as my invention, and desire to secure by Letters Patent, as a means of preventing incrustation of, and the removal of scale from, steam boilers, is—

The employment within the boiler of a cage or case containing metallic scrap, substantially as described.

DAVID MATTHEW. [L. S.]

Witnesses:
NICHOLAS SMITH,
THOMAS B. MATTHEW.